United States Patent
Ronning et al.

(10) Patent No.: US 8,050,980 B2
(45) Date of Patent: *Nov. 1, 2011

(54) SECURE DOWNLOADING OF A FILE FROM A NETWORK SYSTEM AND METHOD

(75) Inventors: Joel Alan Ronning, Minneapolis, MN (US); Kelly J. Wical, Hastings, MN (US)

(73) Assignee: Digital River, Inc., Minnetonka, MN (US)

( * ) Notice: Subject to any disclaimer, the term of this patent is extended or adjusted under 35 U.S.C. 154(b) by 0 days.

This patent is subject to a terminal disclaimer.

(21) Appl. No.: 12/569,148

(22) Filed: Sep. 29, 2009

(65) Prior Publication Data

US 2010/0017417 A1    Jan. 21, 2010

Related U.S. Application Data

(63) Continuation of application No. 09/492,844, filed on Jan. 27, 2000, now Pat. No. 7,617,124, which is a continuation-in-part of application No. 09/372,253, filed on Aug. 11, 1999, now Pat. No. 7,058,597.

(60) Provisional application No. 60/110,952, filed on Dec. 4, 1998.

(51) Int. Cl.
*G06Q 30/00* (2006.01)
(52) U.S. Cl. .......................... 705/26.1; 705/1
(58) Field of Classification Search ................. 705/26.1, 705/1
See application file for complete search history.

(56) References Cited

U.S. PATENT DOCUMENTS

| | | | |
|---|---|---|---|
| 3,798,605 | A | 3/1974 | Feistel |
| 3,990,710 | A | 11/1976 | Hughes |
| 4,200,770 | A | 4/1980 | Hellman et al. |
| 4,218,582 | A | 8/1980 | Hellman et al. |
| 4,264,782 | A | 4/1981 | Konheim |
| 4,405,829 | A | 9/1983 | Rivest et al. |
| 4,424,414 | A | 1/1984 | Hellman et al. |
| 4,446,519 | A | 5/1984 | Thomas |
| 4,458,315 | A | 7/1984 | Uchenick |
| 4,465,901 | A | 8/1984 | Best |
| 4,490,810 | A | 12/1984 | Hon |
| 4,528,643 | A | 7/1985 | Freeny, Jr. |

(Continued)

FOREIGN PATENT DOCUMENTS

JP       57127249       11/1982
(Continued)

OTHER PUBLICATIONS

Dolinar, Lou,"FTP Programs Help You Navigate The Net", Buffalo News; Buffalo, N.Y.; Jul. 7, 1998, pp. 2, extracted from Internet, http://proquest.umi.com on Nov. 8, 2002.

(Continued)

*Primary Examiner* — Yogesh C Garg
(74) *Attorney, Agent, or Firm* — North Oaks Patent Agency; Shaw B. Dempster

(57) ABSTRACT

A download processor for secure downloading of a digital product file when ordered by a user. The order includes a file identifier related to the file and an order identifier related to the order. The download processor performs security checks related to the file, the order, and the user. The file identifier and order identifier are verified based upon information related to the file and the order, and information related to the user is also verified. Based upon the verifications, the download processor selectively permits or denies download of the file to a user machine.

18 Claims, 9 Drawing Sheets

U.S. PATENT DOCUMENTS

| | | |
|---|---|---|
| 4,558,302 A | 12/1985 | Welch |
| 4,558,413 A | 12/1985 | Schmidt et al. |
| 4,567,512 A | 1/1986 | Abraham |
| 4,590,557 A | 5/1986 | Lillie |
| 4,649,510 A | 3/1987 | Schmidt |
| 4,654,799 A | 3/1987 | Ogaki et al. |
| 4,658,093 A | 4/1987 | Hellman |
| 4,672,554 A | 6/1987 | Ogaki |
| 4,674,055 A | 6/1987 | Ogaki et al. |
| 4,685,055 A | 8/1987 | Thomas |
| 4,740,890 A | 4/1988 | William |
| 4,780,905 A | 10/1988 | Cruts et al. |
| 4,787,050 A | 11/1988 | Suzuki |
| 4,791,565 A | 12/1988 | Dunham et al. |
| 4,796,220 A | 1/1989 | Wolfe |
| 4,815,030 A | 3/1989 | Cross et al. |
| 4,827,508 A | 5/1989 | Shear |
| 4,864,516 A | 9/1989 | Gaither et al. |
| 4,888,798 A | 12/1989 | Earnest |
| 4,890,258 A | 12/1989 | Tsugei et al. |
| 4,893,248 A | 1/1990 | Pitts et al. |
| 4,918,602 A | 4/1990 | Bone et al. |
| 4,949,257 A | 8/1990 | Orbach |
| 4,974,160 A | 11/1990 | Bone et al. |
| 4,999,806 A | 3/1991 | Chernow et al. |
| 5,006,849 A | 4/1991 | Baarman et al. |
| 5,010,571 A | 4/1991 | Katznelson |
| 5,014,234 A | 5/1991 | Edwards, Jr. |
| 5,016,009 A | 5/1991 | Whiting et al. |
| 5,027,291 A | 6/1991 | Callahan et al. |
| 5,043,885 A | 8/1991 | Robinson |
| 5,047,928 A | 9/1991 | Wiedemer |
| 5,051,745 A | 9/1991 | Katz |
| 5,103,392 A | 4/1992 | Mori |
| 5,103,476 A | 4/1992 | Waite et al. |
| 5,109,413 A | 4/1992 | Comerford et al. |
| 5,166,886 A | 11/1992 | Molnar et al. |
| 5,199,066 A | 3/1993 | Logan |
| 5,222,134 A | 6/1993 | Waite et al. |
| 5,237,157 A | 8/1993 | Kaplan |
| 5,241,671 A | 8/1993 | Reed et al. |
| 5,267,171 A | 11/1993 | Suzuki et al. |
| 5,269,698 A | 12/1993 | Singer |
| 5,293,422 A | 3/1994 | Loiacono |
| 5,327,563 A | 7/1994 | Singh |
| 5,341,429 A | 8/1994 | Stringer et al. |
| 5,355,302 A | 10/1994 | Martin et al. |
| 5,367,563 A | 11/1994 | Sainton |
| 5,367,667 A | 11/1994 | Wahlquist et al. |
| 5,367,704 A | 11/1994 | Hasuo et al. |
| 5,375,240 A | 12/1994 | Grundy |
| 5,381,539 A | 1/1995 | Yanai et al. |
| 5,386,104 A | 1/1995 | Sime |
| 5,386,369 A | 1/1995 | Christiano |
| 5,388,211 A | 2/1995 | Hornbuckle |
| 5,388,993 A | 2/1995 | McKiel et al. |
| 5,390,297 A | 2/1995 | Barber et al. |
| 5,404,505 A | 4/1995 | Levinson |
| 5,404,510 A | 4/1995 | Smith et al. |
| 5,426,421 A | 6/1995 | Gray |
| 5,426,747 A | 6/1995 | Weinreb et al. |
| 5,430,841 A | 7/1995 | Tannenbaum et al. |
| 5,487,143 A | 1/1996 | Southgate |
| 5,495,411 A | 2/1996 | Ananda |
| 5,509,070 A | 4/1996 | Schull |
| 5,515,538 A | 5/1996 | Kleiman |
| 5,526,485 A | 6/1996 | Brodsky |
| 5,530,865 A | 6/1996 | Owens et al. |
| 5,535,188 A | 7/1996 | Dang et al. |
| 5,537,568 A | 7/1996 | Yanai et al. |
| 5,539,908 A | 7/1996 | Chen et al. |
| 5,557,518 A | 9/1996 | Rosen |
| 5,563,946 A | 10/1996 | Cooper et al. |
| 5,564,038 A | 10/1996 | Grantz et al. |
| 5,579,479 A | 11/1996 | Plum |
| 5,581,764 A | 12/1996 | Fitzgerald et al. |
| 5,598,470 A | 1/1997 | Cooper et al. |
| 5,600,781 A | 2/1997 | Root et al. |
| 5,621,201 A | 4/1997 | Langhans et al. |
| 5,625,690 A | 4/1997 | Michel et al. |
| 5,627,886 A | 5/1997 | Bowman |
| 5,628,015 A | 5/1997 | Singh |
| 5,629,980 A | 5/1997 | Stefik et al. |
| 5,634,012 A | 5/1997 | Stefik et al. |
| 5,649,186 A | 7/1997 | Ferguson |
| 5,649,187 A | 7/1997 | Hornbuckle |
| 5,652,786 A | 7/1997 | Rogers |
| 5,654,905 A | 8/1997 | Mulholland et al. |
| 5,657,390 A | 8/1997 | Elgamal et al. |
| 5,666,411 A | 9/1997 | McCarty |
| 5,666,501 A | 9/1997 | Jones et al. |
| 5,671,279 A | 9/1997 | Elgamal |
| 5,671,281 A | 9/1997 | Campbell et al. |
| 5,671,412 A | 9/1997 | Christiano |
| 5,671,420 A | 9/1997 | Bell et al. |
| 5,673,315 A | 9/1997 | Wolf |
| 5,675,645 A | 10/1997 | Schwartz et al. |
| 5,684,996 A | 11/1997 | Westerholm et al. |
| 5,689,560 A | 11/1997 | Cooper et al. |
| 5,696,975 A | 12/1997 | Moore et al. |
| 5,706,435 A | 1/1998 | Barbara et al. |
| 5,710,884 A | 1/1998 | Dedrick |
| 5,710,887 A | 1/1998 | Chelliah et al. |
| 5,715,403 A | 2/1998 | Stefik |
| 5,727,205 A | 3/1998 | Bell et al. |
| 5,727,215 A | 3/1998 | Rynaski et al. |
| 5,737,416 A | 4/1998 | Cooper et al. |
| 5,740,549 A | 4/1998 | Reilly et al. |
| 5,742,757 A | 4/1998 | Hamadani et al. |
| 5,745,574 A | 4/1998 | Muftic |
| 5,745,754 A | 4/1998 | Lagarde et al. |
| 5,745,879 A | 4/1998 | Wyman |
| 5,754,646 A | 5/1998 | Williams et al. |
| 5,754,754 A | 5/1998 | Dudley et al. |
| 5,757,907 A | 5/1998 | Cooper et al. |
| 5,757,908 A | 5/1998 | Cooper et al. |
| 5,758,068 A | 5/1998 | Brandt et al. |
| 5,761,308 A | 6/1998 | Torii et al. |
| 5,761,651 A | 6/1998 | Hasebe et al. |
| 5,768,527 A | 6/1998 | Zhu et al. |
| 5,768,528 A | 6/1998 | Stumm |
| 5,768,597 A | 6/1998 | Simm |
| 5,771,347 A | 6/1998 | Grantz et al. |
| 5,774,879 A | 6/1998 | Custy et al. |
| 5,778,234 A | 7/1998 | Hecht et al. |
| 5,781,785 A | 7/1998 | Rowe et al. |
| 5,784,461 A | 7/1998 | Shaffer et al. |
| 5,794,052 A | 8/1998 | Harding |
| 5,796,825 A | 8/1998 | McDonnal et al. |
| 5,805,699 A | 9/1998 | Akiyama et al. |
| 5,805,898 A | 9/1998 | Barsness et al. |
| 5,819,226 A | 10/1998 | Gopinathan et al. |
| 5,826,245 A | 10/1998 | Sandberg-Diment |
| 5,832,208 A | 11/1998 | Chen et al. |
| 5,835,721 A | 11/1998 | Donahue et al. |
| 5,835,911 A | 11/1998 | Nakagawa et al. |
| 5,842,024 A | 11/1998 | Choye et al. |
| 5,845,074 A | 12/1998 | Kobata |
| 5,848,154 A | 12/1998 | Nishio et al. |
| 5,859,969 A | 1/1999 | Oki et al. |
| 5,860,012 A | 1/1999 | Luu |
| 5,860,074 A | 1/1999 | Rowe et al. |
| 5,864,620 A | 1/1999 | Pettitt |
| 5,870,543 A | 2/1999 | Ronning |
| 5,875,247 A | 2/1999 | Nakashima et al. |
| 5,883,810 A | 3/1999 | Franklin et al. |
| 5,883,954 A | 3/1999 | Ronning |
| 5,883,955 A | 3/1999 | Ronning |
| 5,887,060 A | 3/1999 | Ronning |
| 5,887,192 A | 3/1999 | Nishio |
| 5,889,860 A | 3/1999 | Eller et al. |
| 5,890,137 A | 3/1999 | Koreeda |
| 5,897,622 A | 4/1999 | Blinn et al. |
| 5,903,566 A | 5/1999 | Flammer, II |
| 5,903,647 A | 5/1999 | Ronning |
| 5,903,881 A | 5/1999 | Scrader et al. |
| 5,903,896 A | 5/1999 | Waldman et al. |

| | | |
|---|---|---|
| 5,907,617 A | 5/1999 | Ronning |
| 5,912,902 A | 6/1999 | Monroe |
| 5,913,040 A | 6/1999 | Rakavy et al. |
| 5,915,019 A | 6/1999 | Ginter et al. |
| 5,915,023 A | 6/1999 | Bernstein |
| 5,918,217 A | 6/1999 | Maggioncalda et al. |
| 5,919,247 A | 7/1999 | Van Hoff et al. |
| 5,920,725 A | 7/1999 | Ma et al. |
| 5,940,834 A | 8/1999 | Pinard et al. |
| 5,956,483 A | 9/1999 | Grate et al. |
| 5,974,443 A | 10/1999 | Jeske |
| 5,982,891 A | 11/1999 | Ginter et al. |
| 5,983,227 A | 11/1999 | Nazem et al. |
| 5,987,454 A | 11/1999 | Hobbs |
| 5,987,480 A | 11/1999 | Donohue et al. |
| 5,999,912 A | 12/1999 | Wodarz et al. |
| 6,004,276 A | 12/1999 | Wright et al. |
| 6,012,087 A | 1/2000 | Freivald et al. |
| 6,021,276 A | 2/2000 | Demke et al. |
| 6,023,698 A | 2/2000 | Lavey et al. |
| 6,026,369 A | 2/2000 | Capek |
| 6,026,413 A | 2/2000 | Challenger et al. |
| 6,029,141 A | 2/2000 | Bezos et al. |
| 6,029,144 A | 2/2000 | Barrett et al. |
| 6,029,154 A | 2/2000 | Pettitt |
| 6,044,471 A | 3/2000 | Colvin |
| 6,049,892 A | 4/2000 | Casagrande et al. |
| 6,073,124 A | 6/2000 | Krishnan et al. |
| 6,074,299 A | 6/2000 | Cohen |
| 6,085,171 A | 7/2000 | Leonard |
| 6,097,390 A | 8/2000 | Marks |
| 6,100,887 A | 8/2000 | Bormann et al. |
| 6,108,642 A | 8/2000 | Findley |
| 6,128,655 A | 10/2000 | Fields et al. |
| 6,134,584 A | 10/2000 | Chang et al. |
| 6,141,006 A | 10/2000 | Knowlton et al. |
| 6,151,708 A | 11/2000 | Pedrizetti et al. |
| 6,154,729 A | 11/2000 | Cannon et al. |
| 6,157,917 A | 12/2000 | Barber |
| 6,167,567 A | 12/2000 | Chiles et al. |
| 6,185,608 B1 | 2/2001 | Hon et al. |
| 6,199,107 B1 | 3/2001 | Dujari |
| 6,223,166 B1 | 4/2001 | Kay |
| 6,226,618 B1 | 5/2001 | Downs et al. |
| 6,233,565 B1 | 5/2001 | Lewis et al. |
| 6,240,396 B1 | 5/2001 | Walker et al. |
| 6,253,186 B1 | 6/2001 | Pendleton et al. |
| 6,263,353 B1 | 7/2001 | Gross et al. |
| 6,263,446 B1 | 7/2001 | Kausik et al. |
| 6,278,449 B1 | 8/2001 | Sugiarto et al. |
| 6,289,452 B1 | 9/2001 | Arnold et al. |
| 6,292,835 B1 | 9/2001 | Huang et al. |
| 6,314,408 B1 | 11/2001 | Salas et al. |
| 6,317,723 B1 | 11/2001 | Walker et al. |
| 6,327,617 B1 | 12/2001 | Fawcett |
| 6,330,546 B1 | 12/2001 | Gopinathan et al. |
| 6,336,098 B1 | 1/2002 | Fortenberry et al. |
| 6,353,926 B1 | 3/2002 | Parthesarathy et al. |
| 6,385,596 B1 | 5/2002 | Wiser et al. |
| 6,389,541 B1 | 5/2002 | Patterson |
| 6,396,805 B2 | 5/2002 | Romrell |
| 6,405,175 B1 | 6/2002 | Ng |
| 6,463,418 B1 | 10/2002 | Todd |
| 6,473,740 B2 | 10/2002 | Cockrill et al. |
| 6,505,171 B1 | 1/2003 | Cohen et al. |
| 6,516,346 B1 | 2/2003 | Asco et al. |
| 6,529,885 B1 | 3/2003 | Johnson |
| 6,574,729 B1 | 6/2003 | Fink et al. |
| 6,594,682 B2 | 7/2003 | Peterson et al. |
| 6,597,891 B2 | 7/2003 | Tantawy et al. |
| 6,601,047 B2 | 7/2003 | Wang et al. |
| 6,622,168 B1 | 9/2003 | Datta |
| 6,639,687 B1 | 10/2003 | Neilsen |
| 6,650,998 B1 | 11/2003 | Rutledge et al. |
| 6,651,108 B2 | 11/2003 | Popp |
| 6,697,948 B1 | 2/2004 | Rabin et al. |
| 6,745,224 B1 | 6/2004 | D'Souza et al. |
| 6,799,165 B1 | 9/2004 | Boesjes |
| 6,807,632 B1 | 10/2004 | Carpentier et al. |
| 6,845,453 B2 | 1/2005 | Scheidt et al. |
| 6,963,923 B1 | 11/2005 | Bennett |
| 2002/0023054 A1 | 2/2002 | Gillespie |
| 2002/0091555 A1 | 7/2002 | Leppink |
| 2002/0133637 A1 | 9/2002 | Popp et al. |
| 2002/0161711 A1 | 10/2002 | Sartor et al. |
| 2003/0028481 A1 | 2/2003 | Flitcroft et al. |
| 2003/0055781 A1 | 3/2003 | Ong |
| 2005/0273779 A1 | 12/2005 | Cheng |

FOREIGN PATENT DOCUMENTS

| | | |
|---|---|---|
| JP | 60077218 | 9/1985 |
| JP | 03083132 | 6/1991 |
| WO | WO99/49424 | 9/1999 |
| WO | WO00/23909 | 4/2000 |
| WO | WO0023928 | 4/2000 |
| WO | WO0023929 | 4/2000 |

OTHER PUBLICATIONS

Woollacott et al., "Web Spoofing poses new security threat", InfoWorld; Framingham; Jan 6, 1997 extracted from Internet, http://proquest.umi.com on Nov. 8, 2002.

"Computer Dictionary", Microsoft Press, Redmond, Washington, 1997, p. 119, heading "Cookie".

"The Internet Complete Reference", Osborne McGraw Hill, California, 1996, p. 358, lines 20-26.

"Inktomi Powers Advanced Information Indexing: SmartCrawl Technology Offers Turnkey Solution to Rapidly Index Web Site Content," Inktomi Press Release, (Dec. 11, 1996), New York.

"Inktomi Unveils Smart Network Strategy to Alleviate Network Overload and Enhance Global Information Access: "Traffic Servers" Are Key to Reducing Redundant Net Traffic," Inktomi Press Release, (Apr. 14, 1997), Berkeley, CA.

"PointCast Unveils First News Network that Reaches Viewers at Their Desktops: Major Industry Players Embrace "Pointcasting" Combines the Timeliness of Broadcast With the Power of the Internet to Deliver Personalized News Instantly," PointCast Press Releases, (Feb. 13, 1996), San Francisco, CA.

"Lotus and PointCast to Collaborate on Interactive Information Delivery System for Corporate Intranets: Companies Will Link PointCast's SmartScreen and I-Server Technology With Lotus Domino Intranet Server and the World Wide Web," PointCast Press Releases, (Jul. 23, 1996), Cambridge, MA/Cupertino, CA.

"PointCast and Infoseek Collaborate to Offer Additional Personalized Content on the PointCast Network: Infoseek Search Technology Enhances PointCast Network Viewer Experience With Instant Search Capabilities," PointCast Press Releases, (Aug. 5, 1996), Cupertino, CA.

"Department of Defense Chooses software.net for Electronic Ordering and Fulfillment Over the Internet:: software.net Opens the Microsoft Government Express! Center for Volume Discount Pricing on Microsoft Products," software.net Press Release, (Apr. 3, 1996), Washington, DC.

"CyberSource Corp. Selected as Electronic Distributor for Over 2,100 Adobe Fonts: First Time Consumers Have Immediate Availability of the Latest Fonts From Adobe Type Library," software.net Press Release, (Jun. 18, 1996), Menlo Park, CA.

"CyberSource and Online Interactive Help Microsoft Meet Heavy Demand for Its Frontpage Software: Electronic Resellers Deliver on the Promise of Electronic Software Distribution," software.net Press Release, (Aug. 6, 1996), Menlo Park, CA/Seattle WA.

"software.net and Microsoft Ink Largest Electronic Software Distribution Deal in Internet History: Defense Logistics and Department of Defense Procurement Agencies Receive Software Via the Internet, Enabling the U.S. Government to Avoid an Estimated $30 Million and Reducing Delivery Times to a Single Day," (Jul. 1, 1997), San Jose, CA.

Prosise, J., PC Magazine-Dos 5 Techniques and Utilities, Ziff-Davis Press, Emeryville, CA 94608: 82-85 (1991).

Prosise, J., "PC Magazine DOS 5-Techniques and Utilities," pp. 365-367, Ziff-Davis Press, PC Magazine, Emeryville, CA, 1991.

Amanda Mitchell, "Chicago Features Spark Online Distribution," Computer Reseller News, (Aug. 1994), p. 101.

"Testdrive Founder/CEO Resigns to Form New Info Highway Company," Business Wire, (Jun. 1994), Cupertino, CA.

Don Clark, "Multimedia: Patents May Raise Price of Information Highway," The Wall Street Journal, (Nov. 1993).

Walter S. Mossberg, "Personal Technology," The Wall Street Journal, (Dec. 1993), p. 12.

"Try and Buy on CD-Rom," Marketing Computers, (Oct. 1993), p. 12.

"Multimedia World," Advertising Age, (Aug. 1993), p. 23.

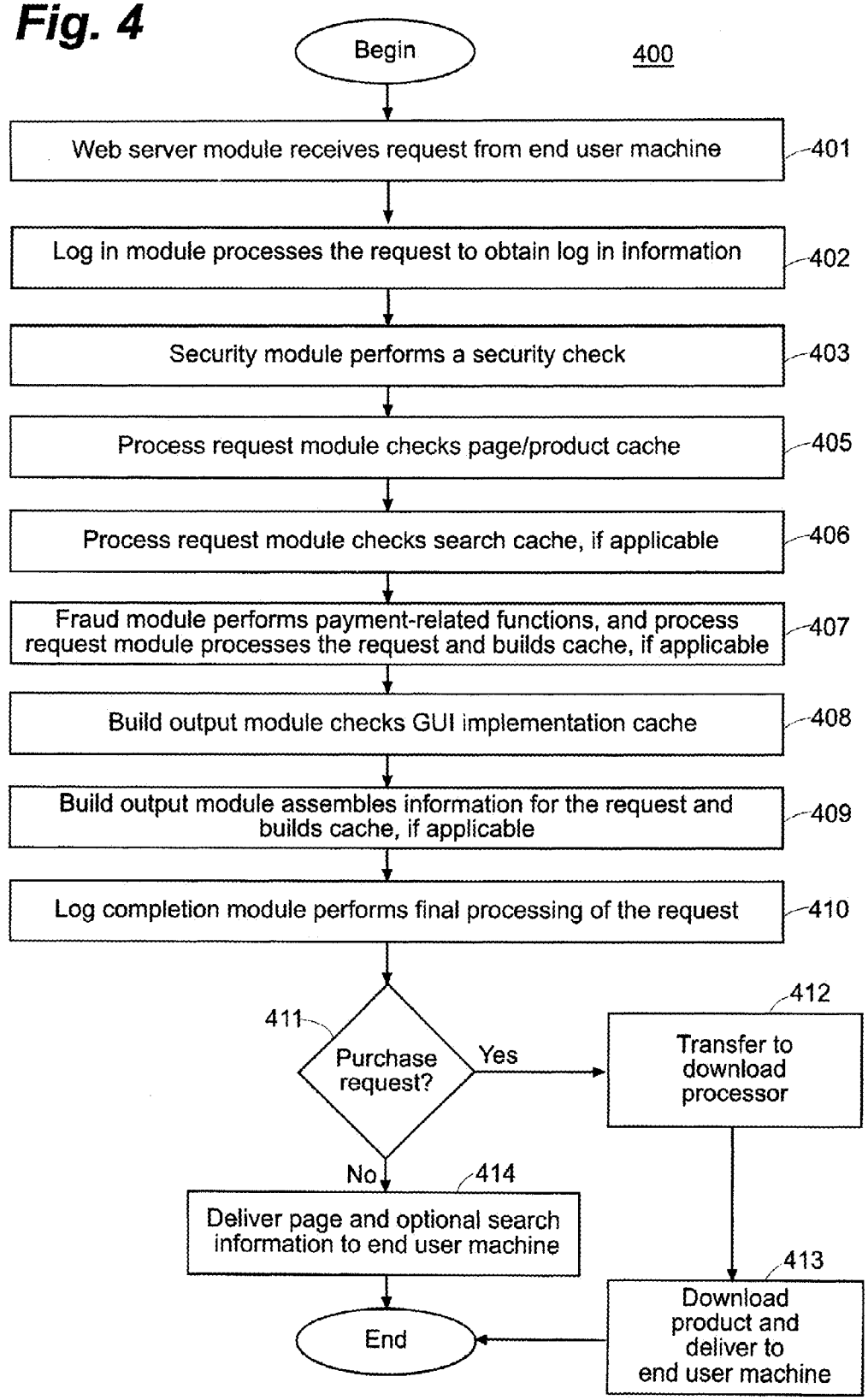

SECURE DOWNLOADING OF A FILE FROM A NETWORK SYSTEM AND METHOD

REFERENCE TO RELATED APPLICATIONS

The present application is a continuation of U.S. patent application Ser. No. 09/492,844, filed Jan. 27, 2000, and entitled "Apparatus and Method for Secure Downloading of Files", which is a continuation-in-part of U.S. patent application Ser. No. 09/372,253, filed Aug. 11, 1999, and entitled "Apparatus and Method for Adaptive Fraud Screening for Electronic Commerce Transactions", now U.S. Pat. No. 7,058,597, issued on Jun. 6, 2006, which claims the benefit of U.S. Provisional Patent Application Ser. No. 60/110,952, filed Dec. 4, 1998, and entitled "Apparatus and Method for Providing Electronic Commerce" under 35 U.S.C. 119(e), all of which are incorporated by reference as if fully set forth.

The present application is related to:

U.S. patent application Ser. No. 09/492,846, filed Jan. 27, 2000, and entitled "Apparatus and Method for Controlling Distribution of Files and File Updates", now abandoned;

U.S. patent application Ser. No. 11/067,396, filed Feb. 22, 2005, and entitled "Electronic Commerce System and Method for Detecting Fraud", now U.S. Pat. No. 7,165,051, issued on Jan. 16, 2007;

U.S. patent application Ser. No. 11/549,036, filed Oct. 12, 2006, and entitled "Electronic Commerce System and Method for Detecting Fraud"; and U.S. patent application Ser. No. 11/549,042, filed Oct. 12, 2006, and entitled "Electronic Commerce System and Method for Detecting Fraud".

FIELD OF THE INVENTION

The present invention relates to an apparatus and method for use in securely downloading files over a network.

BACKGROUND OF THE INVENTION

Various systems exist for distribution of files over the Internet upon purchase by users. With these systems, the user may shop for and purchase various products among web sites. The systems, in providing for electronic downloading of purchased files, must ensure that a user does not obtain files they have not purchased. Certain systems use passwords or wrappers to provide security of the files. Upon valid purchase of a file, the system provides a password to the user, and the user unlocks the file and downloads it to a machine using the password. Use of passwords, however, may complicate the purchase process for the user. In addition, passwords can often be broken, allowing users to fraudulently obtain files without providing payment for them.

Accordingly, a need exists for an improved method and apparatus for securely downloading files and simplifying the download process for users who have purchased files.

SUMMARY OF THE INVENTION

A method and apparatus consistent with the present invention perform secure downloading of a file from a network upon receiving selection of a file. An order is received from a user for download of the selected file, and the order includes a file identifier related to the file and an order identifier related to the order. The file identifier and order identifier are verified based upon particular information related to the file and the order. Download of the file is selectively permitted based upon the verification.

Another method and apparatus consistent with the present invention converts file identifiers for use in generating default storage file names for the corresponding files. An identifier related to a file is received along with a request to download the file. The identifier is converted to a name related to content of the file, and the name is automatically displayed in a request for a file name for storing the file.

DESCRIPTION OF THE DRAWINGS

FIG. 4 is a flow chart of processing for an electronic commerce system.

DETAILED DESCRIPTION

Overview

Figure 1:
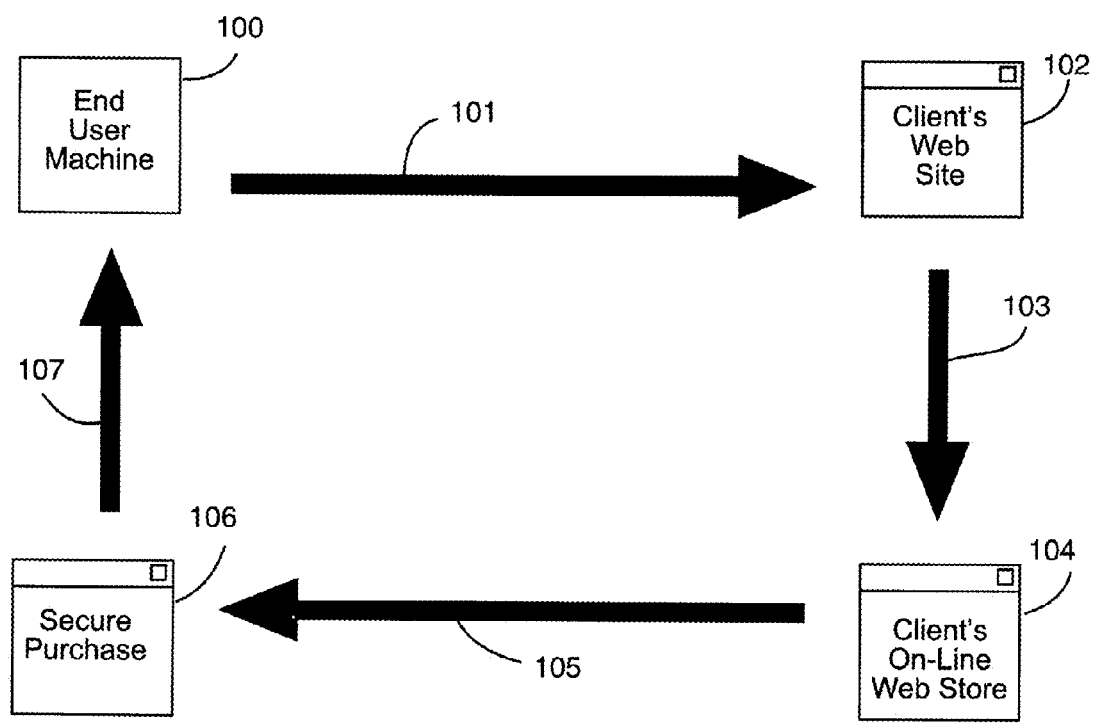
FIG. 1 is a block diagram of an environment for providing electronic commerce.

As shown in FIG. 1, an end user at computer 100 enters a particular client web site 102 through connection 101 in order to shop for products, which may include, but is not necessarily limited to, digital products. Digital products include any information capable of being represented in digital form; examples of digital products include, but are not limited to, the following: software applications; data, music, video, books, text, audio-visual information, multimedia information, graphical information, fonts, and artistic works.

The end user may view a page from the client's web site, for example, listing and describing various products. When the end user indicates a desire to purchase a product by, for example, selecting a purchase icon on the client's web page, the end user's connection 103 is transferred to a commerce network server providing the client's on-line web store 104, and this typically occurs as a background process. The end user may make a secure purchase 105 through page 106 from a product library and, as represented by arrow 107, the purchased product is delivered electronically over the network connection, physically such as by mail, or both electronically and physically.

The purchase typically involves the end user entering payment and related information, such as a credit card number and an associated name and address. In response, the commerce network server determines whether to accept the order and, if accepted, may provide a secure download of the purchased product to the end user's computer for digital products. Determining whether to accept or decline the order involves the use of accessing information concerning prior attempted purchases using information related to or associated with the information in the order, and determining from the related or associated information the likelihood that the order involves a fraudulent attempt to obtain products. Although only one computer 100 and web site 102 are shown, a commerce network server may provide multiple on-line web stores 104 and may interact with end users at multiple computers and multiple web sites.

Electronic Commerce System and Process

Figure 2:
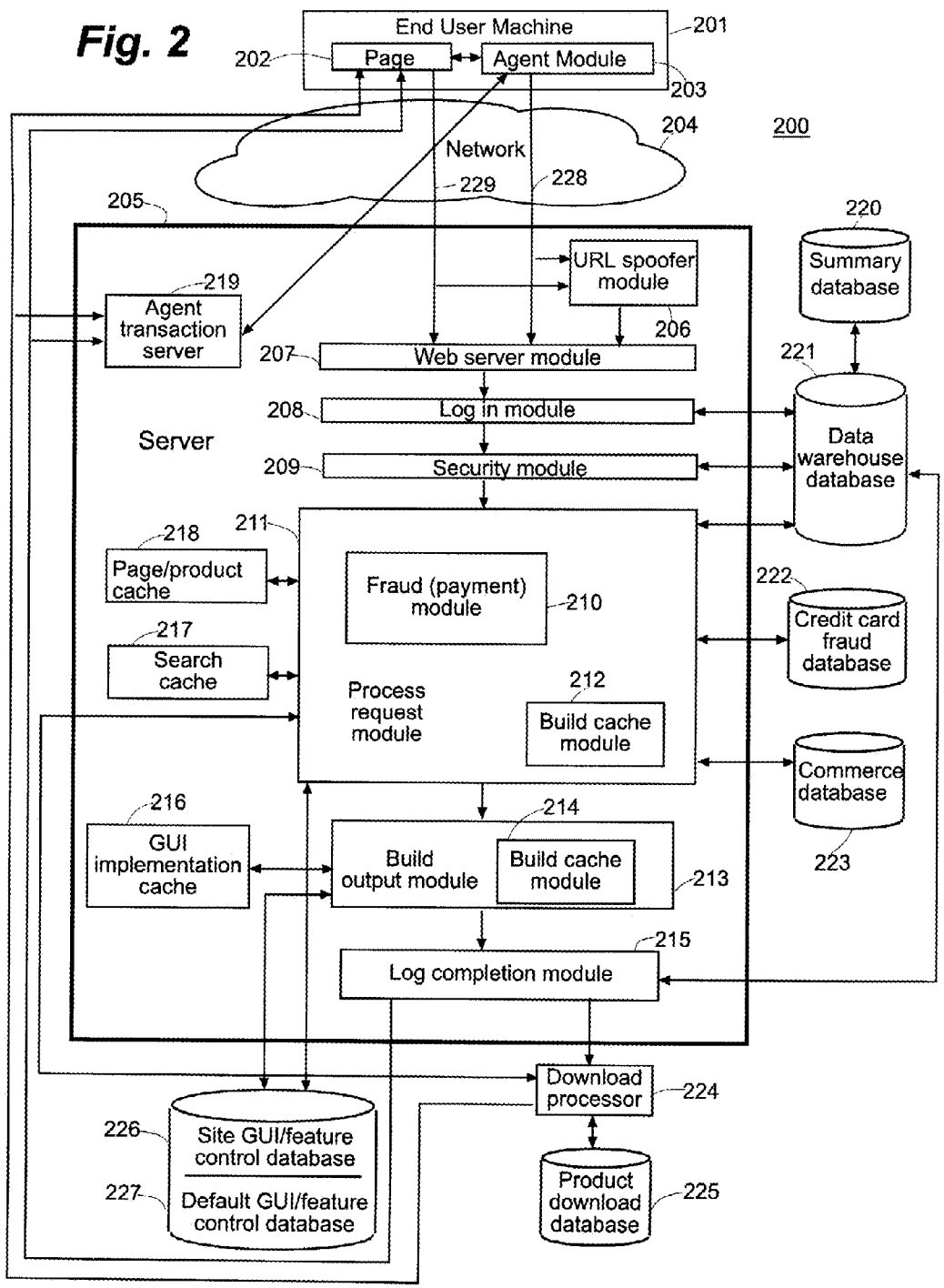
FIG. 2 is a block diagram of an electronic commerce system.

FIG. 2 is a block diagram of an electronic commerce system 200 illustrating interaction between an end user machine 201 and a server 205, illustrating exemplary software modules, caches, and related databases. Server 205 may correspond with the commerce network server described above providing on-line web stores. As shown, end user machine 201 interacts through network 204, such as the Internet or other type of network, with server 205. End user machine 201 may also access a web page on an intermediate server and subsequently be transferred to server 205. End user machine 201 may interact directly with server 205 or interact through an agent module 203, which performs processing specific to a user at end user machine 201. End user machine 201 transmits a request 228 or 229 to server 205 from agent module 203 or page 202, possibly including a request for a particular web page, a request to purchase and download a digital product, or a request for a search for a particular product. Although only one end user machine 201 is shown, server 205 may interact via network 204 with multiple end user machines and multiple intermediate servers maintaining web sites accessed by users at the end user machines. Other examples of systems providing electronic commerce are disclosed in the following U.S. patents, all of which are incorporated herein by reference as if fully set forth: U.S. Pat. Nos. 5,907,617; 5,903,647; 5,887,060; 5,883,955; 5,883,954; and 5,870,543.

In server 205, the request may be transmitted through a uniform resource locator (URL) spoofer module 206, which performs initial processing of the URL. In particular, URL spoofer module 206 changes the URL so that if a user subsequently downloads a product, end user machine 201 by default saves the product under a file name associated with the product but gives no direct access to the physical location on the server. It may also misdirect the user in order to detect attempts to fraudulently obtain products. Alternatively, the request may be transmitted directly to a web server module 207, which performs initial processing on the request.

A log in module 208 receives the request and records certain data associated with the request, such as the user's request, Internet Protocol (TIP) address, date and time, and particular demographic information. The request is then transmitted to a security module 209, which uses heuristics and other techniques in order to detect a person attempting to bypass particular steps of the process, or otherwise receive or access the products without providing payment.

A process request module 211 first checks a page/product cache 218 to determine if the requested web page has been previously requested or, if applicable, the relevant product has been previously requested. If so, process request module 211 accesses information in page/product cache 218 in order to avoid repeatedly generating the same information for the same or a similar request. If applicable, process request module 211 also checks a search cache 217. A build cache module 212 within process request module 211, if applicable, builds information for storage in either of the caches. Downloaded pages are dynamically built, and only certain pages use information from the page cache or search cache.

A fraud (payment) module 210, typically within process request module 211, performs processing necessary to conduct the payment transaction, including processing of credit card information. It also records payment-related information.

A build output module 213 next assembles information for the request. It first checks a graphical user interface (GUI) implementation cache 216 to determine if a requested web page has been previously constructed and provided. If so, it may use the information in GUI implementation cache 216 to avoid unnecessary repeated processing of the same information. If applicable, a build cache module 214 within build output module 213 creates information for storage in GUI implementation cache 216.

A log completion module 215 performs final processing on the request. If the request is only for a web page or search, log completion module 215 transmits the web page or search information back to end user machine 201. If end user machine 201 uses agent module 203, log completion module 215 may transmit information to an agent transaction server 219, which constructs and creates the web page based upon that information and transfers it back to agent module 203 for construction of the web page at page 202 on end user machine 201.

If the request included a request for a product, log completion module 215 transmits the request to a download processor 224, which checks with process request module 211 to verify the authenticity of the request and perform a security check. If the request is valid, as determined by information transmitted back from process request module 211, download processor 224 securely transmits the requested product from a product download database 225 to end user machine 201. The transmitted product may be transmitted through agent transaction server 219 if end user machine 201 uses agent module 203.

The following provides a description of each database shown in FIG. 2. A data warehouse database 221 provides log in information along with keys, which provides an index to associated information in a commerce database 223. Commerce database 223 contains data tables storing information related to products and requests, such as a product table, order table, and other such tables. A summary database 220 provides information from the data warehouse database in summary form. Product download database 225 provides products in digital form for retrieval by the download processor. This configuration provides the advantage of storing the products without wrappers or associated passwords, and instead providing for a secure download of the products. Wrappers or associated passwords may still be used, if desired.

A site GUI/feature control database 226 and default GUI/feature control database 227 may be accessed by process request module 211 and build output module 213 for storage and retrieval of information related to web sites.

A credit card fraud database 222 stores credit card transaction information, including credit card processing history, and other information for adaptive fraud screening. Such information may thus be used in performing another security check. For example, the database may store a list of stolen credit card numbers.

Figure 3:
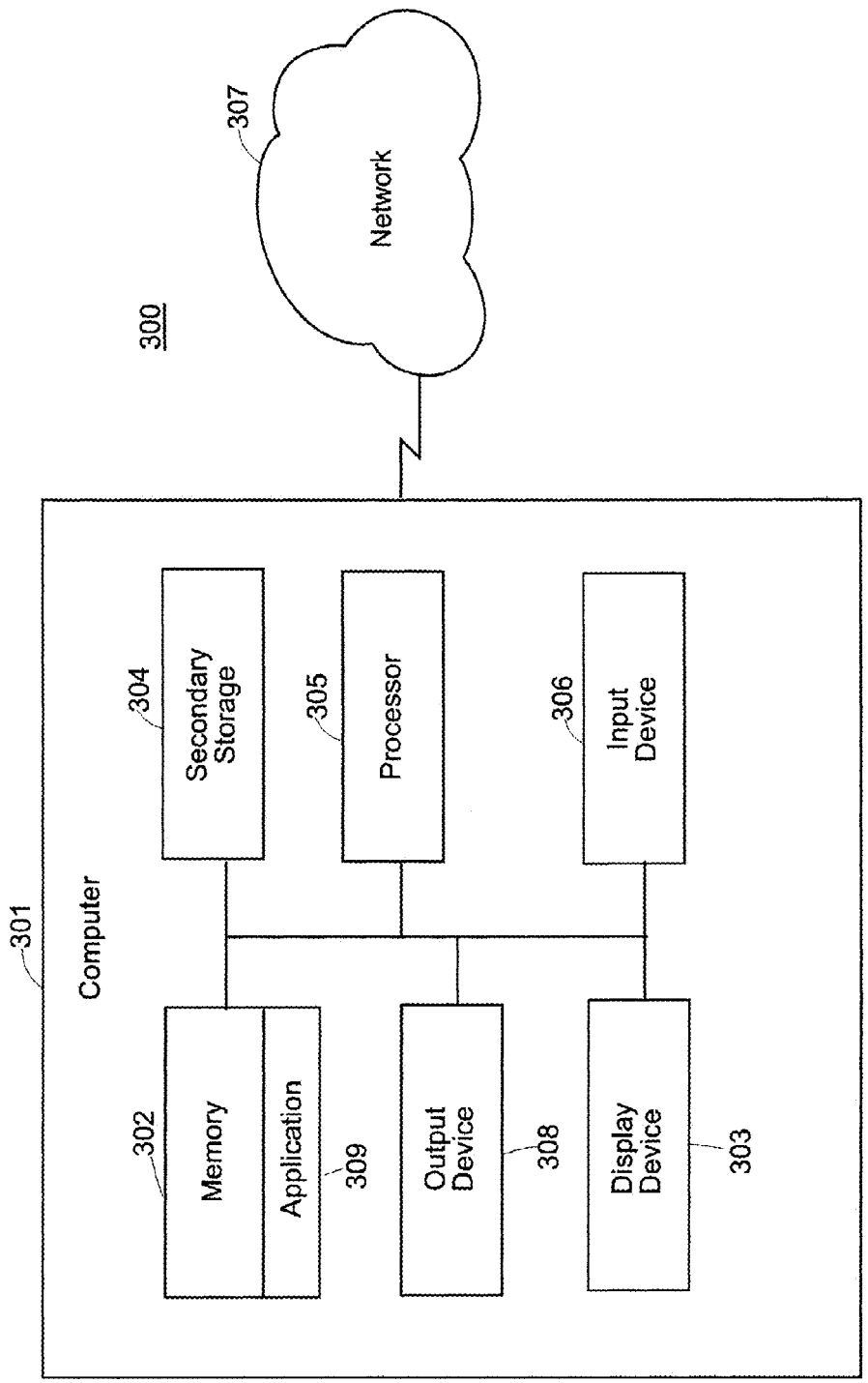
FIG. 3 is a block diagram of exemplary hardware components of an electronic commerce system.

FIG. 3 depicts an exemplary data processing system 300 with a computer 301 illustrating exemplary hardware components of end user machine 201, server 205, and an intermediate server, if used to transfer the end user's connection. Computer 301 includes a connection with a network 307 such as the Internet or other type of network, which may correspond with network 204. Computer 301 typically includes a memory 302, a secondary storage device 304, a processor 305, an input device 306, a display device 303, and an output device 308.

Memory 302 may include random access memory (RAM) or similar types of memory, and it may store one or more applications 309 for execution by processor 305. Applications 309 may correspond with the modules shown in FIG. 2. Secondary storage device 304 may include a hard disk drive, floppy disk drive, CD-ROM drive, or other types of nonvolatile data storage, and it may correspond with the various databases shown in FIG. 2. Processor 305 may execute applications or programs stored in memory 302 or secondary storage 304, or received from the Internet or other network 307. Input device 306 may include any device for entering information into computer 301, such as a keyboard, cursor-control device, or touch-screen. Display device 303 may include any type of device for presenting visual information such as, for example, a computer monitor or flat-screen display. Output device 308 may include any type of device for presenting a hard copy of information, such as a printer, and other types of output devices include speakers or any device for providing information in audio form.

Although computer 301 is depicted with various components, one skilled in the art will appreciate that this computer can contain additional or different components. In addition, although aspects of an implementation consistent with the present invention are described as being stored in memory, one skilled in the art will appreciate that these aspects can also be stored on or read from other types of computer program products or computer-readable media, such as secondary storage devices, including hard disks, floppy disks, or CD-ROM; a carrier wave from the Internet or other network; or other forms of RAM or ROM. The computer-readable media may include instructions for controlling a computer system, such as computer 301, to perform a particular method.

FIG. 4 illustrates high-level processing 400 through electronic commerce system 200. In process 400, web server module 207 receives a request from end user machine 201 (step 401). Log-in module 208 processes the request to obtain log information (step 402). Security module 209 performs a security check (step 403). Process request module 211 checks page/product cache 218 (step 405) and checks search cache 217, if applicable (step 406). Fraud module 210 performs payment-related functions and process request module 211 processes the request and uses build cache module 212 to build a cache, if applicable (step 407). Build output module 213 checks GUI implementation cache 216 (step 408), assembles information for responding to the request, and uses build cache module 214 to build a cache, if applicable (step 409).

Log completion module 215 performs final processing of the request (step 410), and it determines if the request is a purchase request (step 411). If so, it transfers the request to download processor 224 (step 412), which securely downloads the requested product and delivers it to the end user machine 201 (step 413). If the request was not a purchase request as determined by step 411, log completion module 215 delivers page and optional search information to end user machine 201 (step 414).

Commerce System

This feature of electronic commerce system 200 involves providing a single transaction point for processing of electronic commerce, generally involving the series of modules shown in FIG. 2. Examples of the processing in this single transaction point include security, checking for fraud, on-line reporting, and processing orders. The benefits of providing such processing through a single transaction point typically include, for example, scalability, reliability of processing, simplicity of design by avoiding multiple disparate systems, and avoiding repeated processing.

Fraud Detection and Prevention

This feature of electronic commerce system 200 involves preventing fraud and ensuring security during electronic commerce transactions. An electronic commerce transaction involves a user electronically requesting purchase of a product and providing payment for the product. The user may receive the product electronically for digital products or may receive it by other means such as via mail service. The terms fraud and fraudulent refer to attempts by a user to obtain a product without providing proper payment, or otherwise not satisfying requirements for obtaining a product. For example, a user may attempt to use a stolen or false credit card number to obtain a product or attempt to tamper with the system so that the user obtains a product for less than the required price. As another example, certain information related to a user's order may tend to indicate that the user is likely to fail to provide payment, even if the credit card number used appears valid, and system 200 attempts to make that determination based on an analysis of the user's information and associated information.

The fraud detection and prevention may also involve preventing users or customers from having access to certain stored data such as credit card information and products. It involves preventing users from bypassing particular modules or processing in system 200. Users typically interact with system 200 in a known manner for non-fraudulent transactions. Likewise, particular types of interaction tend to indicate that a user is attempting to circumvent system 200 and fraudulently obtain products. Therefore, system 200 analyzes a user's interaction, as well as a user's information submitted on an order typically using an order form and related information in a database, in order to determine a likelihood or probability that the user is engaging in attempted fraud during the transaction. That determination is used as a basis to either accept or decline the order.

The fraud detection and prevention features of system 200 generally include functions within the security and fraud (payment) modules 209 and 210, as further explained below. System 200 may implement modules 209 and 210, or a single module or any number of modules to implement the features, using software stored in memory 302 or secondary storage 304 for execution by processor 305. Modules 209 and 210 may also be implemented using program products or a combination of software and specialized hardware components. In addition, the modules may be executed on multiple processors for processing a large number of transactions, if necessary or desired.

An exemplary implementation of modules 209 and 210 for fraud detection and prevention is disclosed in U.S. application Ser. No. 09/372,253, filed Aug. 11, 1999, and entitled "Apparatus and Method for Adaptive Fraud Screening for Electronic Commerce Transactions."

Global Web Site Management

This feature of electronic commerce system 200 involves providing centralized management of host sites, managing all host sites through a central database. It may include, for example, extending a look and feel of a particular web site into another web site. For example, when an intermediate server transfers an end user's connection to a commerce network server, as described with respect to FIG. 1, the commerce network server may transmit a page having the same look and feel as the page on the intermediate server, thus providing an apparent seamless transition to the end user.

This feature also may include making local changes to a large number of managed web sites. Therefore, instead of making similar changes to each individual web site, system 200 may broadcast those particular changes and make the corresponding changes to the managed web sites. It thus provides an advantage, for example, of easily making changes to a large number of web sites. For example, it may automatically broadcast a few particular features every week to the managed web sites in order to regularly update the sites.

Security Area

The feature of electronic commerce system 200 provides for securely storing clients' products and providing a secure download process, typically without the use of wrappers or passwords. This feature generally involving the series of modules shown in FIG. 2. It includes a database type of security intended at least to simplify the purchase process for a user. A user typically need only enter a credit card number or other payment information and in response the requested product is downloaded to the user's machine.

Therefore, while passwords may be used for security, a password is not required for the user to obtain a purchased file. In addition, the system converts an identifier for the file such that it automatically defaults to a storage file name having a certain relationship to the file content. This conversion may simplify the download process for the user and provide the convenience of having a default storage file name related to the file. The term "file" refers to any type of digital product. A file may include associated information concerning the file, such as a name and size, which is possibly useful for downloading purposes. Alternatively, a file may include only a digital product itself or a portion of a digital product.

Figure 5A:
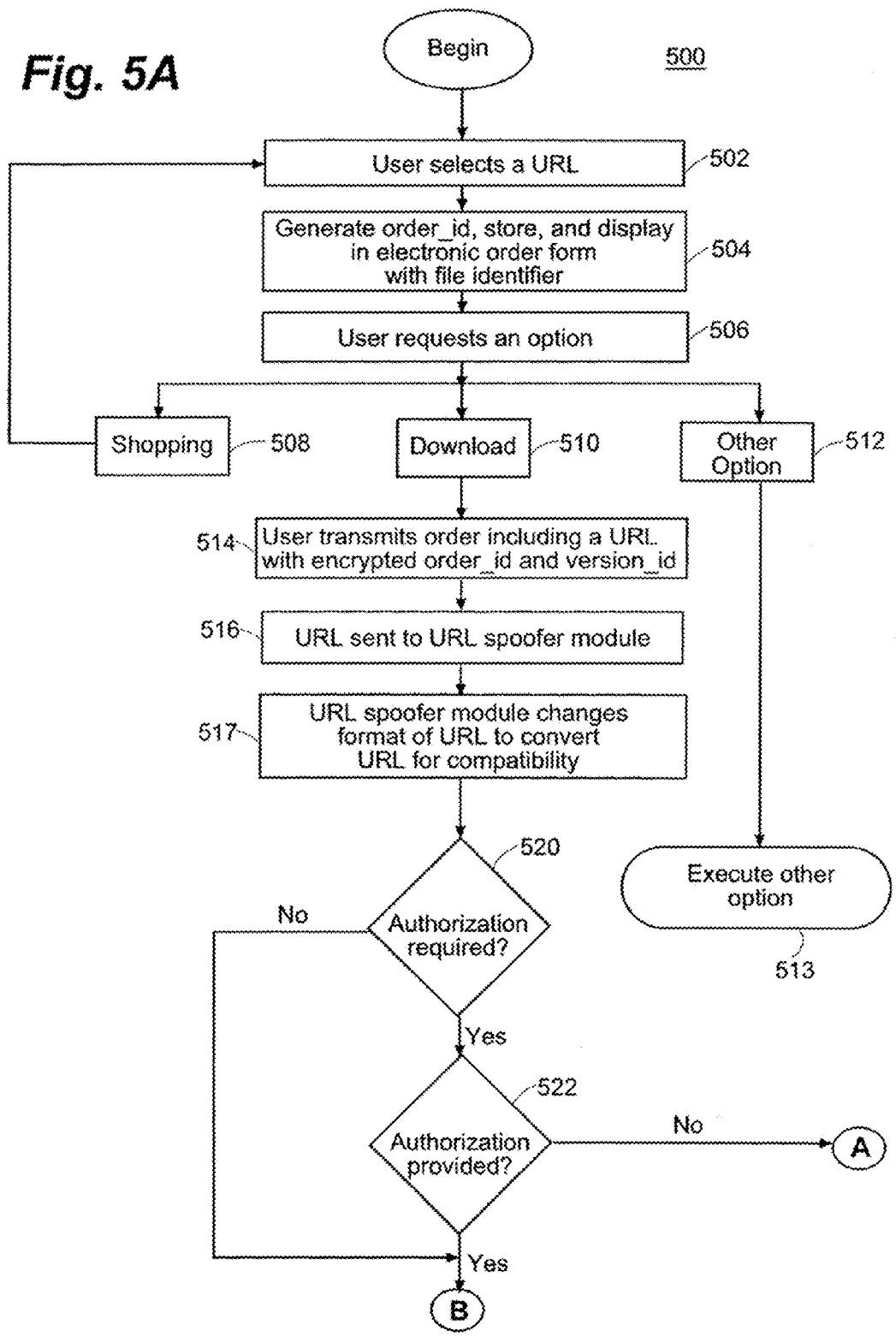
FIGS. 5A-5C are a flow chart of a method for secure downloading of files.
Figure 5B:
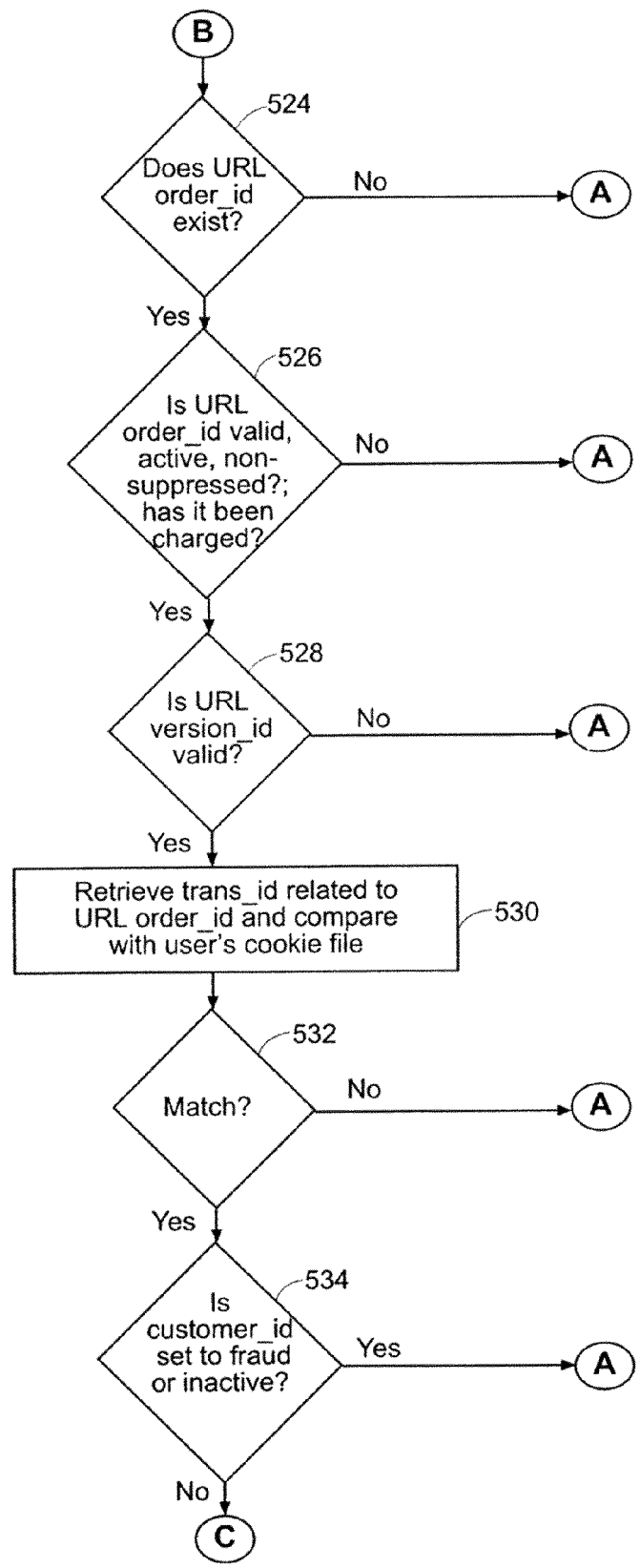
Figure 5C:
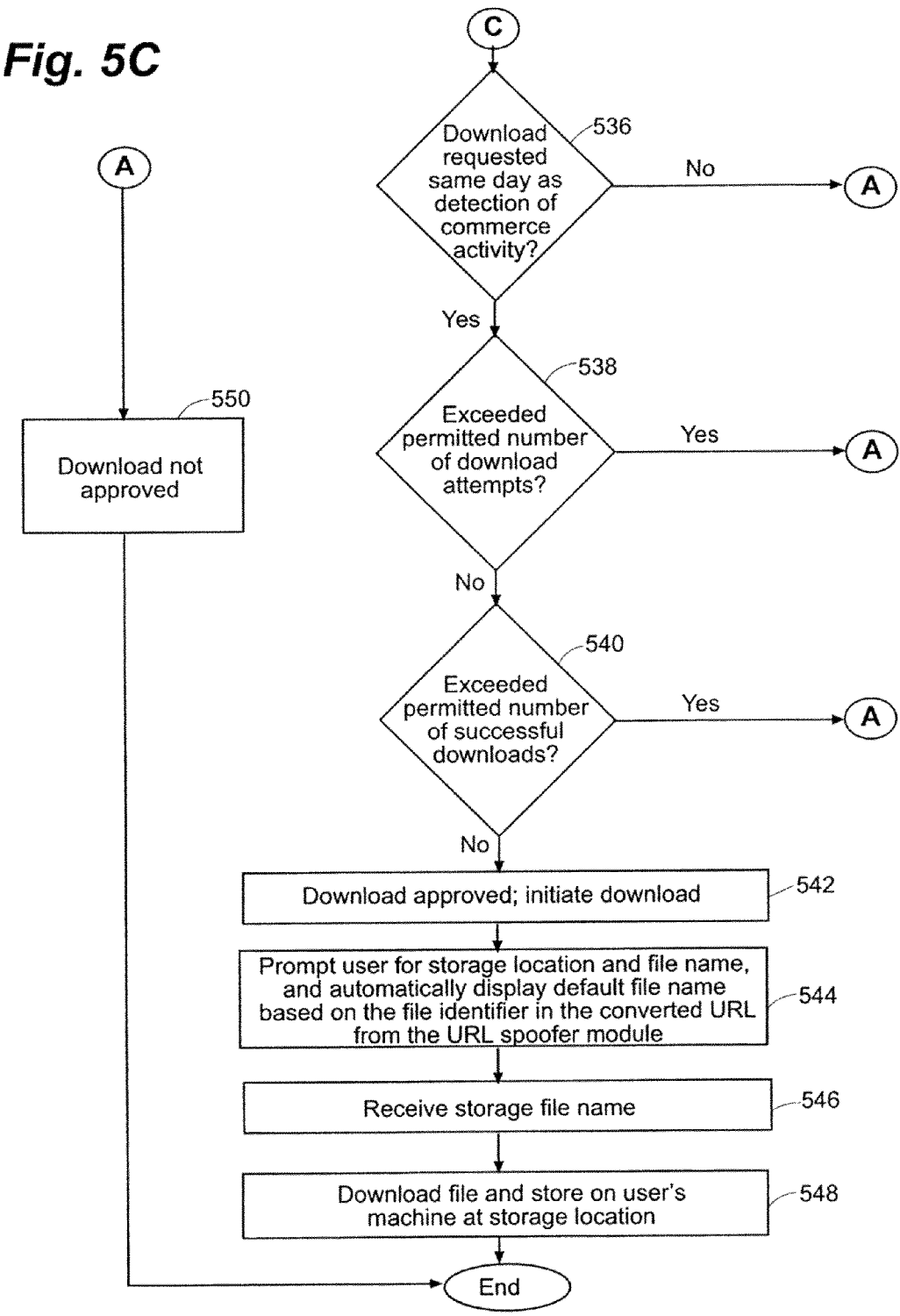

FIGS. 5A-5C are a flow chart of a method 500 for secure downloading of files. Method 500 may be implemented within software modules or program products for execution by download processor 224 providing for download of a file to user machine 201, for example. For performing the downloading, download processor 224 may interact with a web browser or other application on user machine 201 for network or Internet access; examples of web browsers include the Netscape Navigator program and the Microsoft Internet Explorer program.

Figure 6A:
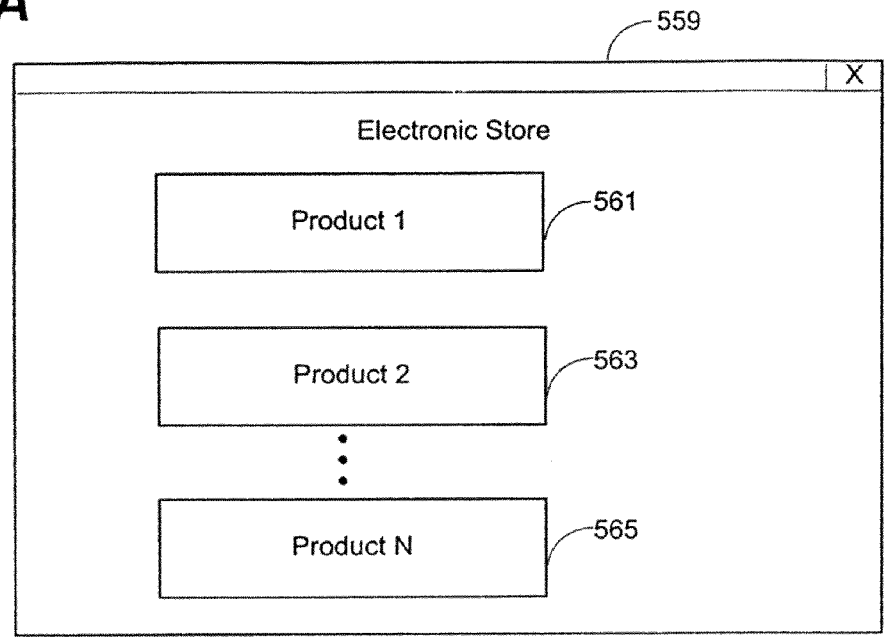
FIG. 6A is a diagram of a screen for an on-line store.
Figure 6B:
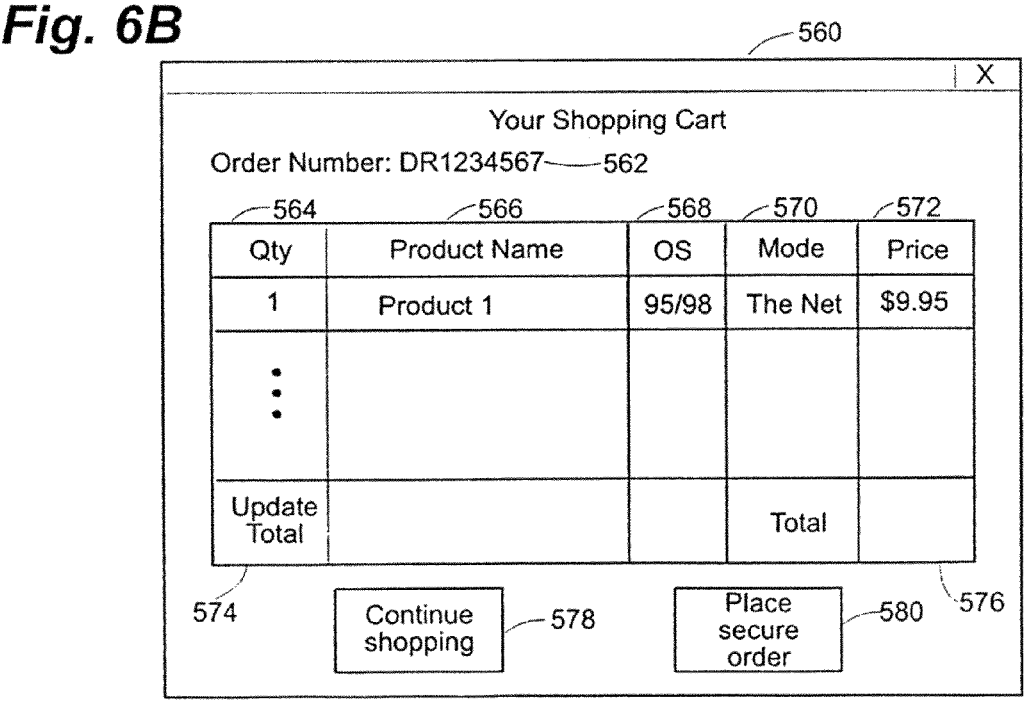
FIG. 6B is a diagram of an electronic order form for placing an order and requesting download of files.
Figure 7:
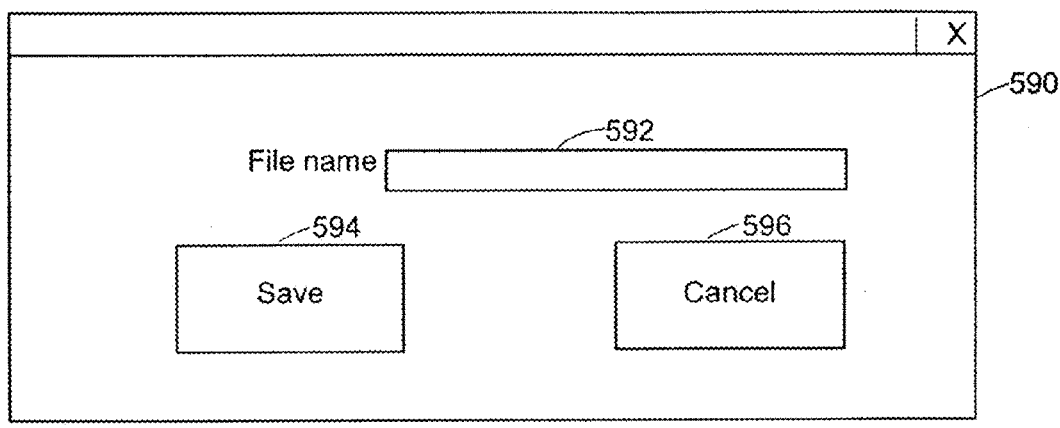
FIG. 7 is a diagram of a screen for receiving a storage location of a file to downloaded.

FIGS. 6A, 6B, and 7 illustrate examples of screens for use with method 500. The term "screen" refers to any visual element or combinations of visual elements for displaying information; examples include, but are not limited to, user interfaces on a display device or information displayed in web pages or in windows on a display device. The screens may be formatted, for example, as web pages in HyperText Markup Language (HTML), or in any other suitable form for presentation on a display device depending upon applications used by users to interact with the system.

The screens include various sections, as explained below, to provide information or to receive information or commands. The term "section" with respect to screens refers to a particular portion of a screen, possibly including the entire screen. Sections are selected, for example, to enter information or commands or to retrieve information or access other screens. The selection may occur, for example, by using a cursor-control device to "click on" or "double click on" the section; alternatively, sections may be selected by entering a series of key strokes or in other ways such as through voice commands or use of a touch screen. In addition, although the screens shown in FIGS. 6A, 6B, and 7 illustrate a particular arrangement and number of sections in each screen, other arrangements are possible and different numbers of sections in the screens may be used to accomplish the same or similar functions of displaying information and receiving information or commands. Also, the same section may be used for performing a number of functions, such as both displaying information and receiving a command.

In executing method 500, shown in FIGS. 5A-5e, download processor 224 maintains a database of information concerning electronic commerce transactions for use in performing security checks. These transactions may involve users' or customers' requests to download a product, such as a digital product. Table 1 illustrates an exemplary database structure for use in performing the security checks.

TABLE 1

| ORDER is associated with: | ORDER includes: | | | |
|---|---|---|---|---|
| | order_id | customer_id | tran_id | date |
| VERSION 1, which includes: | version_id 1 | name 1 | price 1 | |
| ... | | | | |
| VERSION N, which includes: | version_id N | name N | price N | |

When a user, also referred to as a customer, submits a request for an order from user machine 201 to server 205, download processor 224 generates a database entry for the order. The submitted order includes a URL containing information for the order, and the URL identifies a file at server 205; a program is run at server 205 to find the actual storage location based upon the identification of the file. The order may include the following information: an order identifier (order_id) is a unique code identifying this order; a customer identifier (customer_id) is a unique code identifying the customer who submitted this order; a transaction identifier (trans_id) is a code generated by a web browser used to submit this order; and a date identifies the date when this order identifier was generated.

Each order is associated with one or more products. A version is used to identify each product, such as a digital product, in the order. Each version associated with this order may include the following information: a version identifier (version_id) is a unique code, such as a StockKeeping Unit (SKU), identifying a product; a name is a name of the product; and a price identifies a price for the product. The information in the order and associated versions are further explained below.

With each order, for example, a user may have multiple products identified in an electronic order form, examples of which are referred to as a "shopping cart" or "shopping basket" for electronic commerce transactions. When the user submits the order, the information for the order and association versions (identified products) is sent to download processor 224 through network 204. Download processor 224 then performs several security checks, at least some of which use the received order and version information. If the transaction passes all security checks, download processor 224 permits user machine 201 to download one or more ordered files.

Method 500 illustrates the security checks and other processing of an order. In method 500, the user selects a URL (step 502). The selection of the URL typically occurs at a web site providing certain products for sale. Therefore, a user may electronically shop among various web sites and, upon viewing a product or file to be purchased, select an identifier corresponding to the file in order to select its URL. For example, a product may be identified by an icon displayed on a web page, and the user may select the icon in order to select a URL associated with it. Various types of file identifiers may be used to identify a file and possibly its network address or storage location. Examples include URLs or uniform resource identifiers (URIs), and using URLs provide for a common and standard file type identifier.

FIG. 6A is a diagram of an exemplary electronic store screen for permitting electronic shopping of products or files. Electronic store screen 559 may display, for example, the identification of various products or files as shown in section 561 for a first product, section 563 for a second product, and section 565 for a third product. The identification of the products or files may be shown through a displayed icon, product description, URL, or other such identifier. The displayed information is linked to a URL such that, even if the URL is not displayed, selection of the product or file identifier results in selection of the corresponding URL. Table 2 provides an example of a URL structure associated with a file. This structure illustrates identification of an order identifier, a version identifier, and possibly other name-value pair information such as other version identifiers for ordering multiple products.

TABLE 2 http://spf.domain-name
/OID=order identifier (name-value pair)
&IID=version identifier (name-value pair)
&other name-value pair 1
...
&other name-value pair N
&NAME=/file-name.exe Upon detecting the selected URL, download processor 224 generates an order identifier for the selected file, stores the order identifier, and displays it in an electronic order form with the file identifier (step 504). By storing the order identifier, download processor may subsequently use the stored (valid) order identifier to verify a transaction. FIG. 6B is an example of a screen having an electronic order form 560 displaying selected files to the user through a web browser on the user's machine. In particular, order form 560 may be displayed as an HTML web page. Electronic order 560 provides an example of an order number 562 corresponding to the generated order identifier in step 504. An order identifier in this example is a randomly generated and unique code associated with a particular order and contained in the received URL. Download processor 224 maintains a database of the generated order identifiers, associated with each order, for use in verifying orders. Order identifiers may include any type of unique code generated from, for example, alphanumeric information and possibly other characters to identify a particular order.

An encrypted order identifier is specified in the second line of the URL structure provided in Table 2 after the code "/OID=". The code "/OID" permits download processor 224 to locate the order identifier (name-value pair) in the received URL. In order to verify the received order identifier, download processor 224 compares it with the stored generated order identifiers in order to determine if the received order identifier matches a stored generated order identifier. Therefore, download processor 224 may determine if, for example, a user tampered with or otherwise altered the order identifier in the received URL. Order identifiers may be transmitted to download processor 224 encrypted with any type of encryption technique, as in this example.

As illustrated in order form 560, a quantity section 564 displays an indication of a quantity of each digital product or file selected by the user, a product name section 566 identifies a selected product, an operating system (OS) section 568 identifies a type of operating system for the selected file if available, a mode section 570 displays a mode by which the user desires to receive the file, and a price section 572 displays a price for the file.

In this example, mode section 570 indicates that the file is to be electronically downloaded. OS section 568 is optional in that files may include digital products other than software applications, as mentioned above. An update section 574 may be used to update the selected files upon selection by a user, and a section 576 displays a total price for the selected files. Order form 560 also provides the user with options such as a shopping section 578 to continue on-line shopping and an order section 580 to place a secure order for the selected files.

In method 500, the user next requests an option after selecting a file (step 506). For example, the user may select shopping section 578 to continue shopping at a web site (step 508), select order section 580 to place a secure order for the selected files (step 510), or select other options (step 512). Other options may include performing a search for particular products or files. Based upon such other option, if selected, the system executes the option (step 513).

Upon a user's selection of order section 580 to place an order, or selection of another option to request a download of a file, user machine 201 transmits an order to server 205 with an encrypted order_id and one or more encrypted version_ids (step 514). An "order" is a request to download a particular file. In this example, the order specifies the URL, which contains the order identifier and version identifier. Also, an order may contain or be associated with other information, such as the customer identifier and date information, as described above.

The selected URL which is associated with the file is sent to URL spoofer module 206 (step 516). URL spoofer module 206 changes a format of the URL in order to convert the URL for compatibility with certain web browsers (step 517). In particular, URL spoofer module 206 converts the URL such that it provides the web browser with a default file name for storing the file.

Table 3 provides an example of the URL structure shown in Table 2 before and after the spoofing step.

TABLE 3

Before Spoof:
http://spf.domain-name
/OID=order identifier (name-value pair)
&IID=version identifier (name-value pair)
&other name-value pair 1
...
&other name-value pair N
&NAME=/file-name.exe
After Spoof:
http://www.domain-name
?OID=order identifier (name-value pair)
&IID=version identifier (name-value pair)
&other name-value pair 1
...
&other name-value pair N
&NAME=file-name.exe In this example, the spoofing conversion of the URL for web browser compatibility includes the following formatting changes. The "spf" in the first line is changed to "www," meaning that an intermediate web server intercepted the URL in order to perform the conversion and sent the converted URL to download processor 224 for the security checks. In the second line, the "/" symbol has been changed to a "?" symbol. The second line contains an encrypted order identifier. In the last line, the "/" symbol has been removed before the file name, in this example "file-name.exe". By changing the "/" symbol to a "?" symbol in the second line, certain web browsers recognize the second line as a name-value pair. By also removing the "/" symbol in the last line, those web browsers will generate a default storage location having the file name, thus providing compatibility for those web browsers.

HyperText Transport Protocol (HTTP) URLs use Common Gateway Interface (CGI) protocol for standard communication between a web browser on a user machine and a server. Download processor 224, for example, uses HTTP URLs for the user's order. CGI protocol uses the "?" symbol in the URL to designate a query string, which includes name-value pairs separated by "&" symbols. Download processor 224 parses the query string by detecting the "&" symbols to identify the name-value pairs, such as the order identifier and version identifier. Accordingly, at least for certain types of web browsers, replacing the "/" symbol with a "?" symbol is required to signify the name-value pairs to those web browsers.

With those changes in format, when a user requests that a web browser save a file, the web browser displays a save screen 590, an example of which is shown in FIG. 7, and displays a default storage file name in a name section 592 for the user to either accept or change. By using the spoofing conversion for all web browsers, they generate a default file name having the true name of the file and thus automatically provide and display a file name for storing the file having some relation to the content of the file. Instead of generating a storage location of "C:\program files\default" they generate a storage location of "C:\program files\file-name.exe" in this example, where "file-name" would be the actual name of the file. In this manner, if a user repeatedly downloads files, the user need not manually enter file names for storage locations and the same default storage location will not be generated and displayed for the same files. The spoofing conversion thus provides a convenience to the user in the default file name provided by the user's web browser, which uses the file name to specify a storage location on the user's machine. Steps 516 and 517 are optional in that download processor 224 need not necessarily convert the URL for a download process.

Upon receiving the order, server 205 may determine if authorization is required (step 520). For certain systems, the user may require authorization in addition to the security features of the download process in method 500. If authorization is required, the system determines if authorization has been provided for this user (step 522). An example of a system for determining and providing such authorization is described in U.S. application Ser. No. 09/372,253, filed Aug. 11, 1999, and entitled "Apparatus and Method for Adaptive Fraud Screening for Electronic Commerce Transactions." The providing of authorization may also be indicated by the system not denying authorization to the user.

If authorization is provided, download processor 224 performs a number of security checks before permitting download of the file. Download processor 224 determines if the URL order identifier exists for the selected file (step 524). If the URL order identifier exists, download processor 224 determines if it is valid, active, and non-suppressed (step 526). By maintaining the database of the generated order identifiers, download processor 224 may also associate certain status information with the order identifiers. For the status information, the term "valid" means that the order identifier exists in the database, the term "active" means that the order was not canceled before download, and the term "non-suppressed" means that the order was not canceled after download. Other types of status information may be stored and used with order identifiers as well.

Download processor 224 also determines if the URL order identifier has been charged to a credit card number or if payment have otherwise been provided (step 526). It may communicate with another database or module authorizing and providing for payment in order to determine the payment status.

If both conditions are satisfied (steps 524 and 526), download processor 224 then determines if the URL version identifier is valid (step 528). A version identifier is a number in this example that identifies a product, such as a digital product, requested through the order. Version identifiers may include any type of unique code or other information to identify a product. The version identifier in this example is a part of the URL. The unique code for the version identifier may be generated from, for example, alphanumeric information and possibly other characters.

An encrypted version identifier is specified in the third line of the URL structure shown in Table 2 after the code "&IID=". The code "IID" permits download processor 224 to locate the version identifier (name-value pair) in the received URL. Download processor 224 maintains a database of valid version identifiers for particular products and compares the version identifier in the received URL with the version identifiers in the database to determine if the version identifier in the received URL corresponds with a valid version identifier. Therefore, download processor may determine, for example, if a user tampered with or otherwise altered the version identifier in the received URL. Version identifiers may be transmitted to download processor 224 encrypted with any type of encryption technique, as in this example.

If the security check in step 528 is satisfied, download processor 224 retrieves the transaction identifier related to the URL order identifier and compares it with the user's cookie file on user machine 201 (step 530). Cookie files are known in the art and include data created by a web server and stored on a user's machine. Cookie files contain a range of URLs (network addresses) for which they are valid. When the user's web browser encounters those URLs again, it sends the specific cookie files for the URLs to the web server.

Transaction identifiers are known in the art with respect to conventional web browsers, which automatically generate and transmit transaction identifiers for communication between the web browser and a server. Download processor 224 verifies the transaction identifier by determining if a match is provided between the transaction identifier in the cookie file and the transaction identifier in the URL. If they match, the transaction has passed this security check (step 532).

Download processor 224 then verifies the customer identifier by determining, for example, if the customer identifier associated with the order is set to fraud or inactive (step 534). For certain systems, an indication may be manually entered into a database containing or associated with the orders to deny purchases to particular users who, for example, have been associated with fraudulent transactions in the past. A customer identifier includes any type of code or other information identifying a particular customer, and it may be sent with the URL when the customer places an order. Alternatively, it may be associated with the order when the order identifier is generated and subsequently retrieved upon receiving the customer's order. Other types of verification of a customer identifier may be used.

If the transaction passes the security check in step 534, download processor 224 verifies a time parameter related to submission of the order. It performs the verification by determining if the download requested occurred on the same day as detection of commerce activity (step 536). Commerce activity includes any type of particular activity related to an order. In this example, commerce activity includes the act of purchasing a product, which results in generation of an order identifier, or visiting a customer service web site related to the order or products in the order. Download processor 224 checks to determine if the order was submitted on the same day as the order identifier was generated by comparing the date information associated in the order with a current date as maintained by an internal clock in server 205 or download processor 224. The time parameter may include activity occurring on the same day, as in this example, or other defined time-based events such as determining if submission of the order and generation of the order identifier occur within the same week.

If the security check in step 536 is satisfied, download processor 224 determines if the user has exceeded a permitted number of requested downloads (step 538). Download processor 224 may be configured to permit only a particular number of download attempts for the same URL for the same user. In this example, download processor permits only fifteen download attempts for the same URL by the same user; however, it may be configured to permit any number of download attempts. Download processor 224 stores the number of download attempts associated with the user's submitted URLs to perform the verification.

If the security check in step 538 is satisfied, download processor 224 determines if the user has exceeded a permitted number of successful downloads (step 540). Download processor 224 may be configured to permit only a particular number of successful downloads for a particular file by a particular user. In this example, download processor permits only six successful downloads for the same file by the same user; however, it may be configured to permit any number of download attempts. Download processor 224 stores the number of successful downloads associated with the user's submitted URLs to perform the verification.

If the transaction satisfies the security check in step 540, as well as all the previous security checks, the download transaction has been approved and download processor 224 initiates downloading the file (step 542).

Download processor 224 may automatically generate a file name for use by the web browser in storing the file. Therefore, the system typically prompts the user for a storage location and file name for storing the file and automatically displays a default file name based upon the file identifier in the converted URL from URL spoofer module 206 (step 544).

Save screen 590 (FIG. 7) may be displayed to a user in order to request a storage location and display a default location. Screen 590 includes name section 592 in which to display a file name for storing the file and possibly receive a file name from the user. The user may select section 594 in order to initiate the download to save the file using the filename entered in section 592, or the user may select section 596 in order to cancel the requested download. Download processor 224 thus receives a file name for storing the file upon the user's selection of section 594 (step 546).

Download processor 224 then downloads the file to the user's machine, and the web browser at the user's machine uses the received file name specified in section 592 to store the file (step 548). The download may occur through conventional HTTP communication, using any wireline or wireless network.

Download processor 224 may automatically download the file to a temporary folder on user machine 201 such as "C:\temp\" on the hard disk drive for the user machine. In downloading the file to the temporary folder, it may store the file under the name entered by the user or under the file name generated by URL spoofer module 206. Another example of a system for managing downloading of files is described in U.S. patent application Ser. No. 09/492,846, filed Jan. 27, 2000, of Joel Ronning, Kelly Wical, and Marc Kukura, entitled "Apparatus and Method for Controlling Distribution of Files and File Updates.".

Accordingly, the user need only select the file and request downloading of the file to initiate the download process security checks. If the transaction did not pass any of the exemplary security checks identified above (steps 522, 524, 526, 528, 532, 534, 536, 538, and 540), the download was not approved and the system declines download of the file (step 550).

Method 500 may include more or fewer security checks than shown. Also, the particular steps may be executed in other sequences, since a particular sequence of steps for the security checks, such as the one shown, is not necessarily required to perform all the security checks. The security checks may be performed in addition to other types of security checks or features performed by server 205.

Cache Management for Dynamic Web Pages

This feature of electronic commerce system 200 concerns a dynamic cache providing for a fast page response and dynamic pages, typically guaranteeing that pages contain current information. It generally involves caches 216, 217 and 218 shown in FIG. 2, providing cache processing for three areas: product searching; GUI implementation (particular features on a web page); and static page building (a web page as a whole).

The complexity of product searching often affects speed of a response. Providing caching of information means that the same information need not be repeatedly retrieved from an external database and constructed into a responsive web page. Rather, the information may be cached locally and quickly retrieved in response to the same or a similar request. This feature maintains up-to-date information by knowing to create and destroy information interactively for the caches.

Intelligent Agent

An intelligent agent includes an application that resides locally on a client machine in order to perform processing specific to a user of the machine, generally involving agent module 203 and agent transaction server 219 shown in FIG. 2. It includes at least two aspects, a pull side and a push side. The pull side involves the agent obtaining information and knowing how to link to a server and provide the information to the user in a personal way, customized for that user. It shields the user from the order process, for example, in order to simplify it. The agent may also perform system management, for example, performing a background process that scans the user's system in order to manage licensed software, perform archival control, and perform other such processing.

The push side involves making special information available to the user through the agent. For example, if the user already ordered a particular product, the agent may inform the user of any bugs in the product, product upgrades, or related products. That information is "pushed" to the agent from the server. The server may provide initial filtering of information given to the agents, and the agents perform additional filtering in order to present the information in a specific way to the user.

An example of an agent program is described in U.S. patent application Ser. No. 09/492,846, filed Jan. 27, 2000, of Joel Ronning, Kelly Wical, and Marc Kukura, entitled "Apparatus and Method for Controlling Distribution of Files and File Updates."

While the present invention has been described in connection with an exemplary embodiment, it will be understood that many modifications will be readily apparent to those skilled in the art, and this application is intended to cover any adaptations or variations thereof. For example, different labels for the various modules and databases, and various hardware embodiments for the servers and machines, may be used without departing from the scope of the invention. This invention should be limited only by the claims and equivalents thereof.

What is claimed is:

1. A method performed by an electronic commerce system having a server and an end user machine interacting through a network for secure downloading of a file from the network, the method comprising steps of:
   receiving selection of a file via the network;
   receiving an order from a user for download of the selected file via the network, the order including a file identifier related to the file and an order identifier related to the order;
   verifying the file identifier based upon particular information related to the file;
   verifying the order identifier based upon particular information related to the order, including one of:
      determining if the order identifier is active, meaning the order was not canceled before the download of the file; and
      determining if the order identifier is non-suppressed, meaning the order was not canceled after the download of the file; and
   selectively permitting the download of the file to the end user machine based upon the verification of the file identifier and the verification of the order identifier.

2. The method of claim 1 wherein the verifying the file identifier step includes verifying one or more of the following: a version identifier related to the file; a uniform resource locator for the file; or a customer identifier associated with the user.

3. The method of claim 1 wherein the verifying the order identifier step includes determining if the order identifier is valid for the order, meaning the order identifier exists for the order.

4. The method of claim 1 further including a step of verifying a transaction identifier associated with the order, and wherein the permitting step further includes permitting download of the file based upon the verification of the transaction identifier.

5. The method of claim 1 further including a step of displaying a default identification as a file name for storing the file based upon an identification of the file.

6. The method of claim 5 further including a step of transmitting the generated file identifier for display to the user.

7. The method of claim 1 wherein the permitting step includes denying the download of the file based upon a customer identifier associated with the user.

8. The method of claim 1 wherein the permitting step further includes permitting download of the file based upon a number of attempted downloads of the file by the user.

9. The method of claim 1 wherein the permitting step further includes permitting download of the file based upon a number of successful downloads of the file by the user.

10. An electronic commerce system having a server and an end user machine interacting through a network for secure downloading of a file from the network, the server comprising:
    a processor;
    a memory;
    a selection module containing program instructions which when executed causes the server to perform the operations of receiving selection of a file via the network;
    a receive module containing program instructions which when executed causes the server to perform the operations of receiving an order from a user for download of the selected file via the network, the order including a file identifier related to the file and an order identifier related to the order;
    a file identifier module containing program instructions which when executed causes the server to perform the operations of verifying the file identifier based upon particular information related to the file;
    an order identifier module containing program instructions which when executed causes the server to perform the operations of verifying the order identifier based upon particular information related to the order, including one of:
       a module containing program instructions which when executed causes the server to perform the operations of determining if the order identifier is active, meaning the order was not canceled before the download of the file; and
       a module containing program instructions which when executed causes the server to perform the operations of determining if the order identifier is non-suppressed, meaning the order was not canceled after the download of the file; and
    a download module containing program instructions which when executed causes the server to perform the operations of selectively permitting the download of the file to the end user machine based upon the verification of the file identifier and the verification of the order identifier.

11. The electronic commerce system of claim 10 wherein the file identifier module includes a module containing program instructions which when executed causes the server to perform the operations of verifying one or more of the following: a version identifier related to the file; a uniform resource locator for the file; or a customer identifier associated with the user.

12. The electronic commerce system of claim 10 wherein the order identifier module includes a module containing program instructions which when executed causes the server to perform the operations of determining if the order identifier is valid for the order, meaning the order identifier exists for the order.

13. The electronic commerce system of claim 10 further including a module containing program instructions which when executed causes the server to perform the operations of verifying a transaction identifier associated with the order, and wherein the permission module further includes a module containing program instructions which when executed causes the server to perform the operations of permitting download of the file based upon the verification of the transaction identifier.

14. The electronic commerce system of claim 10 further including a module containing program instructions which when executed causes the server to perform the operations of displaying a default identification as a file name for storing the file based upon an identification of the file.

15. The electronic commerce system of claim 14 further including a module containing program instructions which when executed causes the server to perform the operations of transmitting the generated file identifier for display to the user.

16. The electronic commerce system of claim 10 wherein the download module includes a module containing program instructions which when executed causes the server to perform the operations of denying the download based upon a customer identifier associated with the user.

17. The electronic commerce system of claim 10 wherein the permission module further includes a module containing program instructions which when executed causes the server to perform the operations of permitting download of the file based upon a number of attempted downloads of the file by the user.

18. The electronic commerce system of claim 10 wherein the permission module further includes a module containing program instructions which when executed causes the server to perform the operations of permitting download of the file based upon a number of successful downloads of the file by the user.

* * * * *